United States Patent
Doda et al.

[11] Patent Number: 5,874,670
[45] Date of Patent: Feb. 23, 1999

[54] METHOD OF ESTIMATING IRREGULAR WEAR OF TIRES BY RECORDING AN AMOUNT OF WEAR OF PAINTED PORTIONS OF THE TIRE AS IMAGE INFORMATION AT MULTIPLE REGULAR TIME INTERVALS

[75] Inventors: Toshifumi Doda, Kodaira; Shigeru Endo, Tokyo; Yoshibumi Yamaguchi, Hachioji, all of Japan

[73] Assignee: Bridgestone Corporation, Tokyo, Japan

[21] Appl. No.: 839,368

[22] Filed: Apr. 18, 1997

[30]     Foreign Application Priority Data

Apr. 22, 1996  [JP]  Japan ................................. 8-122774
  Aug. 1, 1996   [JP]  Japan ................................. 8-218098

[51] Int. Cl.$^6$ .................................................. G01M 17/02
[52] U.S. Cl. ..................................................... 73/146; 73/8
[58] Field of Search ............................................. 73/146, 8

[56]              References Cited
              U.S. PATENT DOCUMENTS 4,918,976  4/1990  Fogal ..................................... 73/146 X
  5,088,321  2/1992  Kajikawa et al. ...................... 73/146

FOREIGN PATENT DOCUMENTS

A-8-29296  2/1996  Japan .

*Primary Examiner*—Joseph L. Felber
*Attorney, Agent, or Firm*—Oliff & Berridge, PLC

[57]              ABSTRACT

A method of estimating irregular wear of pneumatic tires, in which a deformable paint is coated on the tire tread surface in a regular manner. The wearing degree of the paint is recorded as a plurality of image information at regular time intervals, while running the tire under a loaded condition. A predetermined portion of the respective image information is divided into a number of pixels. Weights are applied to the respective pixels corresponding to painted potions, respectively, such that each weight is inversely proportional to the duration of time during which the paint has been worn. Wear information for the painted portion is converted into a wide range wear information which also covers the respective pixels for the non-painted portion, by calculating the wear level values of the respective pixels including the non-painted portion in view of the weight of the pixels and weights of the periphery pixels. The wear level values are mapped and the mapped information is used to estimate irregular wear occurring state on the tread surface.

3 Claims, 6 Drawing Sheets

Irregular wearing level

■ 80%~100%

▨ 60%~80%

▦ 40%~60%

▨ 20%~40%

▨ 0%~20%

FIG_1

METHOD OF ESTIMATING IRREGULAR WEAR OF TIRES BY RECORDING AN AMOUNT OF WEAR OF PAINTED PORTIONS OF THE TIRE AS IMAGE INFORMATION AT MULTIPLE REGULAR TIME INTERVALS

BACKGROUND OF THE INVENTION

1. Field of the Invention

The present invention relates to a method of accurately and reliably estimating irregular wear of pneumatic tires for vehicles, which occurs on the tread surface of tires during a running period until a rolling distance of about 10,000 km is reached.

2. Description of Related Art

An irregular wear that occurs on the tire tread surface exerts a considerable influence and often degrades various kinds of property and performance of the tire. Accordingly, it is highly desirable to accurately and reliably estimate the manner in which irregular wear occurs on existing tires and prototype tires, respectively. This is because the estimation can be reflected to the design, refinement, etc., of the tread pattern so as to improve the durability of tires and achieve the desired maneuverability for a longer use period.

In this context, there have been various proposals regarding the method of estimating the manner in which irregular wear occurs on the tread surface. For example, JP-A-8-29296 discloses a method of estimating the wearing state of tires, which has been developed by the assignee of this application.

According to the wearing state estimating method disclosed in JP-A-8-29296, a paint is coated on a tread surface of a tire in a regular lattice- or dot-manner, in which the paint is distinct in brightness from the tread surface, and can be deformed following the deformation of the tread surface. The manner in which the wear occurs is estimated based on the wearing degree of the paint while running the tire under a loaded condition. With such a method, when the paint is worn due to a pressure contact with the road surface during the running of the tire under a loaded condition, the wear amount of the regularly coated paint increases due to slips and resultant friction force occurring on the surface of the respective ridge portions of the tire. This makes it possible to accurately estimate the irregular wear state of the tread surface, by visual observation and inspection of the wear state of the paint.

The wearing state estimating method disclosed in JP-A-8-29296 requires setting of a relatively large distance between the coated paint dots so that the tread surface is significantly exposed and the friction characteristic of the tread rubber is more accurately reflected to the wear amount of the paint, with a premise that the irregular wear of the entire tread surface is estimated solely by the wear information of the painted portion. Accordingly, it may be difficult to achieve a satisfactory accuracy of estimation of irregular wear of tires. The known method is capable of estimating irregular wear only by two kinds of information obtained before and after the running of the tire under the loaded condition. This means that the progress of wearing degree cannot be grasped in a time sequence. In such a context, it may be difficult to further improve the accuracy of estimation.

SUMMARY OF THE INVENTION

The present invention has been accomplished in order to eliminate or at least mitigate the above-mentioned problems.

Specifically, it is a primary object of the present invention to provide a method of estimating irregular wear of tires, which is capable of accurately and reliably estimating irregular wear which occurs on the tread surface of tires during a running period until a rolling distance of about 10,000 km is reached.

The present invention is based on a unique concept that, in estimating irregular wear of tires, the accuracy of estimation can be significantly improved by converting the wearing degree of the paint into image information at a plurality of stages, and dividing into a number of pixels the entirety or part of the tire tread surface including the painted portion to which the respective pixel information are to be processed, and subsequently performing synthesis and other image processing of the respective pixels.

Incidentally, for tires that have been used over a rolling distance far exceeding 10,000 km, there is a case that a so-called self-excited wear occurs due to interaction of tire regions which have been subjected to significantly different wear. In this instance, the occurrence of self-excited wear is hard to predict so that the estimation accuracy of irregular wear may not be satisfactorily achieved.

According to the present invention, there is provided a method of estimating irregular wear of pneumatic tires, comprising the steps of:

coating a paint on a tread surface of a tire in a regular manner, wherein the paint can be deformed following deformation of the tread surface;

recording a wearing degree of the coated paint as a plurality of image information at regular time intervals, while running the tire under a loaded condition;

dividing a predetermined portion of each image information into a number of pixels, and storing the respective pixels;

applying weight factors to the pixels corresponding to the painted potions, respectively, wherein each weighting factor is inversely proportional to a duration of time during which the paint has been worn;

converting a wear information for the painted portion into a wide range wear information which also covers respective pixels for a non-painted portion of the tread, by calculating a wear level value of the respective pixels including the non-painted portion, in view of a weighting factor of the pixel and weighting factors of the peripheral pixels; and mapping each wear level value and estimating an irregular wear occurring state on the tread surface based on the mapped wear level value.

According to the present invention, the wear degree of the paint is recorded and stored as the image information of a plurality of stages, so that the progress of the wear of the paint, that is, the progress of the wear of the tread surface, can be visually displayed in the time sequences, which results in a marked improvement in the estimation accuracy of the irregular wear. Also, the whole predetermined portion of the respective image information are divided into a number of pixels, and the respective pixels corresponding to the painted portion are weighted in inverse proportion to the time during which the paint has been worn, based on experiential rule obtained with respect to the irregular wear occurring on actual tires, which results in highly precise and accurate estimation of the irregular wear as the lattice-, net- or dot-pattern of the painted portion.

The reason why the pixel is weighted in inverse proportion to the time during which the paint has been worn, is also based on experiential rule that the shorter the time during which irregular wear of tires occurs is, the faster the subsequent wear progresses. It is to be noted in this connection that weighting factors are not applied to the pixels corresponding to the non-painted portion.

Furthermore, the relationship between the irregular wear of the respective portions of the tread surface including the non-painted portion can be made clear by converting the wear information for the painted portions into a wide range wear information which also covers the respective pixels for non-painted portions, by calculating the wear level value of the respective pixels including the non-painted portions, in view of the weighting factor of the pixel and weighting factors of the periphery pixels. Then, the occurring state of the irregular wear on the tread surface can be estimated simply, easily and clearly, by mapping the respective wear level values and visually observing the mapped information.

Preferably, the wear level value of each pixel is calculated by the following equation:

$$(A/B) \times 100$$

where A is an average value of the weights of respective pixels corresponding to the painted portions, included in a predetermined periphery region of each pixel, with each said pixel as the center, and B is the maximum weighting factor. In this instance, the calculation time can be made short, and the image can be made in satisfactorily improved conformity with the actual abrading state.

More preferably, the estimated amount of irregular wear of the tread surface is quantified based on the wear level value of each pixel in relation to the location where the irregular wear occurs. In this instance, the estimated results of the irregular wear can be inspected simply and rapidly to the tire on which the irregular wear actually occurs due to the actual running of the tire.

Further objects and advantages of the invention will become more apparent from the following description of the preferred embodiment of the invention as illustrated in the accompanying drawings.

DETAILED DESCRIPTION OF THE PREFERRED EMBODIMENT

The method according to the invention will be described in further detail with reference to the drawings showing a preferred embodiment thereof.

Figure 1:
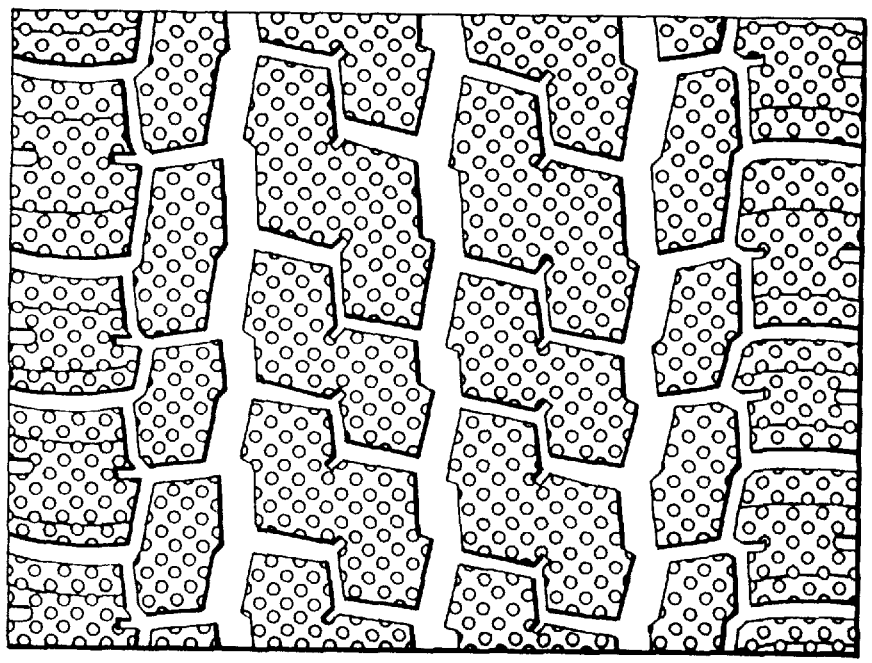
FIG. 1 is a developed view of the tire tread surface showing the painted state thereon.

First of all, a paint is coated on a tread surface of a tire in a regular lattice-, net-, or dot-manner. The paint is preferably distinct in brightness from the tread surface, and is deformable following the deformation of the tread surface. FIG. 1 is a developed view of one example of the tread surface, in which the paint is coated on the tread surface, that is, on the surface of the ridge portion in a regular dot-manner, such that the outline of each dot is circular or arcuate.

On this occasion, when the paint is coated in the above manner, the entire tread surface or at least the surface of the ridge portion must be exposed sufficiently. Meanwhile, if the exposed area is too wide, the distance between the coated paint dots becomes excessively large so that a desired estimation accuracy is difficult to achieve. It is therefore preferable that the ratio in area of the painted portion to the total ridge portion of the tire is within a range of from 30 to 50%. In other words, if the area ratio is less than 30%, the estimation accuracy of the irregular wear is degraded. On the other hand, if the area ratio exceeds 50%, it is difficult to significantly reflect the friction characteristic of the tread rubber onto the wear amount of the paint.

Preferably, the width of the coated paint when coated in a lattice- or net-manner, or the diameter of the coated paint when coated in a dot-manner paints is about 2.5 to 3.5 mm, and the distance between the neighboring pattern elements of the coated paints is about 1 to 2 mm, in view of the processing capability of the image which is recorded in the subsequent step.

Before coating the paint on the tread surface, the tire is run under a loaded condition during a short time for the purpose of removing any surface contamination. The tread surface is then washed or wiped by appropriate organic solvent, and the paint is sprayed or otherwise coated over a pattern sheet having a predetermined punched pattern, which has been laid on the tread surface.

Figure 2:
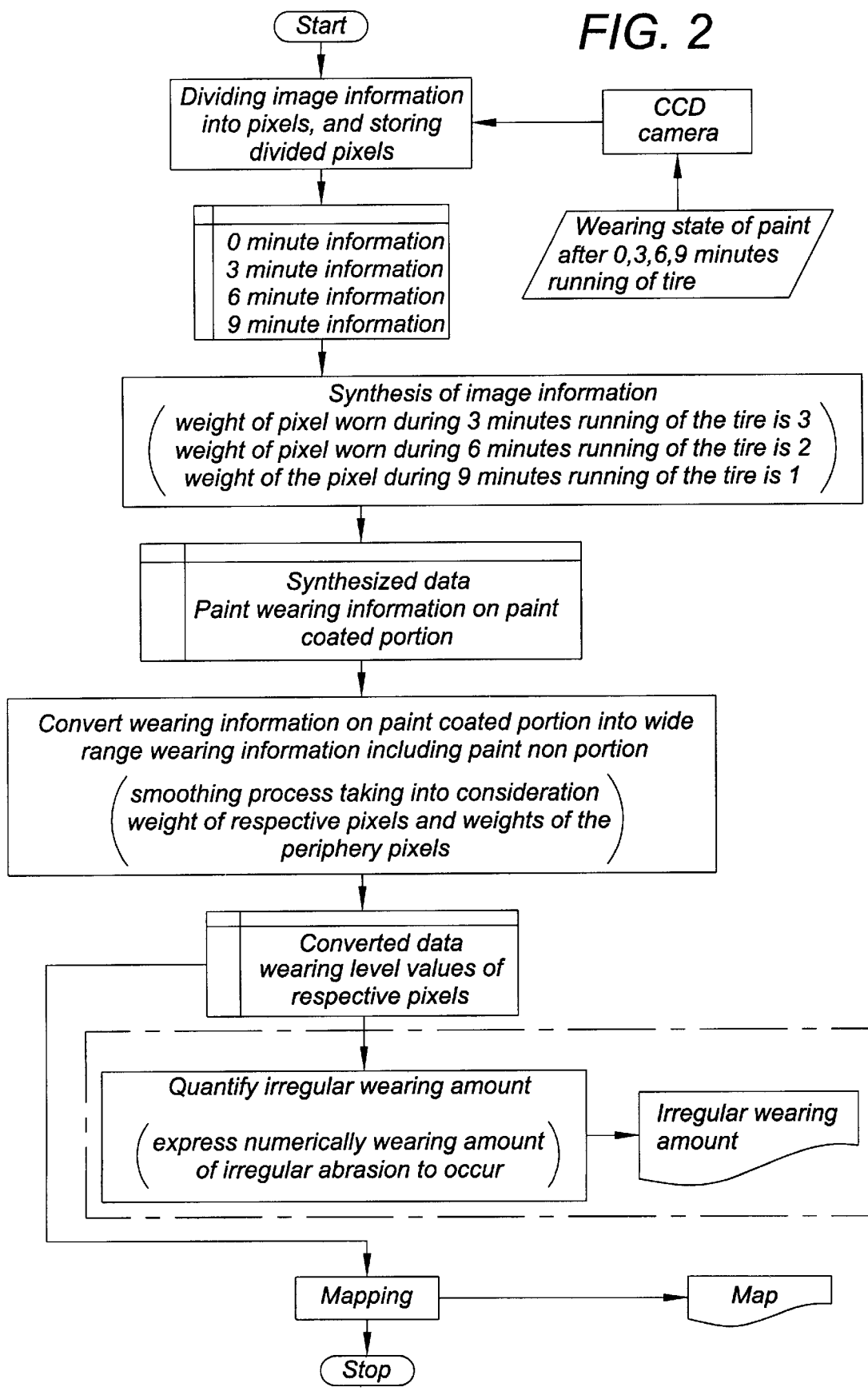
FIG. 2 is a flowchart showing one example of the image information processing steps which can be suitably applied to the present invention.

After preparation of the tire has been completed as described above, the tire is run under a loaded condition and the wear degree of the coated paint is recorded as image information at a plurality of stages including a non-wear state of the coated paint, preferably at regular time intervals, by a video camera, CCD camera, digital camera, etc. In the flowchart exemplified in FIG. 2, the above images are to be recorded at the time periods of 0, 3, 6 and 9 minutes by a CCD camera. During the image recording, it is effective to keep constant photograph angle, magnitude, illumination, etc., taking into consideration the synthesis of the image information which is executed at the subsequent step.

The respective recorded image information is read by a computer and a predetermined portion of the respective image information is enlarged and divided into not less than 50,000 pixels, preferably 100,000 to 300,000 pixels, and then stored. Of course the enlargement, division into pixels, etc., are carried out with respect to the very same portion of the respective image information for each of the time periods, i.e., 0, 3, 6 and 9 minutes.

The respective image information, especially the image information corresponding to the painted portion, is subjected to a synthesis and the respective pixels are weighted in inverse proportion to the time during which the paint has been worn, based on experiential rule obtained with respect to irregular wear of tread surfaces. Specifically, as exemplified in FIG. 2, the factors of estimating the irregular wear are incorporated into the respective pixels corresponding to the painted portion, assuming that the weighting factor of the pixel which is worn during three minutes running of the tire is 3, the weighting factor of the pixel which is worn during six minutes running of the tire is 2, and the weighting factor of the pixel which is worn during nine minutes running of the tire is 1. Accordingly, wear information is obtained relating to the painted portion which results from the above synthesis of the predetermined portion of the respective image information.

In order to convert the so-obtained wear information relating to the painted portion into a wide range wear information which is extended with high estimation accuracy to the respective pixels including the non-painted portions, there is calculated wear level values of the respective pixels including the non-painted portions, taking into consideration the weighting factor of the pixel and the weighting factors of the periphery pixels. The wear level value represents the relationship between the occurrence and progression time of the wear on the tread surface, in which the larger the wear level values, the more the occurrence and the progressing time of the wear on the tread surface, whereas the smaller, the less. For example, it can be obtained by the use of the following equation:

$$(A/B) \times 100$$

where A is an average value of the weights of respective pixels corresponding to the painted portions, included in a predetermined periphery region of each of the pixels, with each of the pixels as a center, and B is the maximum weight value.

As described above, wear information relating to the painted portions can be used to calculate; wide range wear information which is extended to the respective pixels including the non-painted portion.

Then, the estimation map of the irregular wear of the entire tread surface is prepared based on the respective wear level values. This map can be visually observed on the display and can also be stored and/or printed out. Therefore, the locations where irregular wear tends to occur on the tread surface of the given tread pattern, and the amount of the irregular wear can be identified simply and easily, with high accuracy and reliability.

Moreover, in order to inspect the thus estimated results, it is preferable that the estimated amount of irregular wear of the tread surface is quantified based on the wear level values of the respective pixels in relation to the location when the irregular wear, in addition to the preparation of the above-mentioned map. In this instance, the estimating accuracy can be confirmed easily and rapidly, by comparing the actually measured values of the amount of irregular wear of tires occurring by actual running of the tire under a loaded condition, with the estimated value.

Experimental Example

A tire which has been run during one hour at a speed of 40 km/h is washed by an organic solvent over a length of about 20 cm on the circumference of the tread, and a paint is then coated within the region in a dot-manner as shown in FIG. 1, with a diameter of about 2.5 mm and a distance between the dots of 1 mm. Then, the tire is mounted on a test machine in the room and is run under a normally loaded condition.

On this occasion, the tire size is 185/70 R14 and the test condition is defined by a load of 350 kg, an internal pressure of 2.0 kgf/cm$^2$, a lateral force of 70 kgf, and a speed of 40 km/h.

Figure 3:
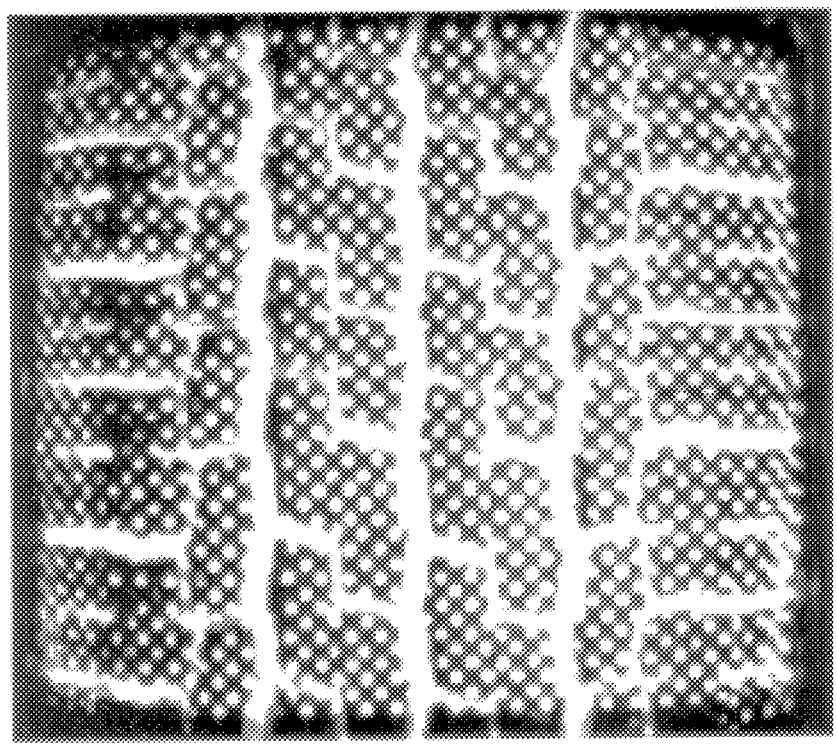
FIG. 3 is a view showing the bit map image of the tread surface illustrating the wearing state of the paint after the lapse of 3 minutes.
Figure 4:
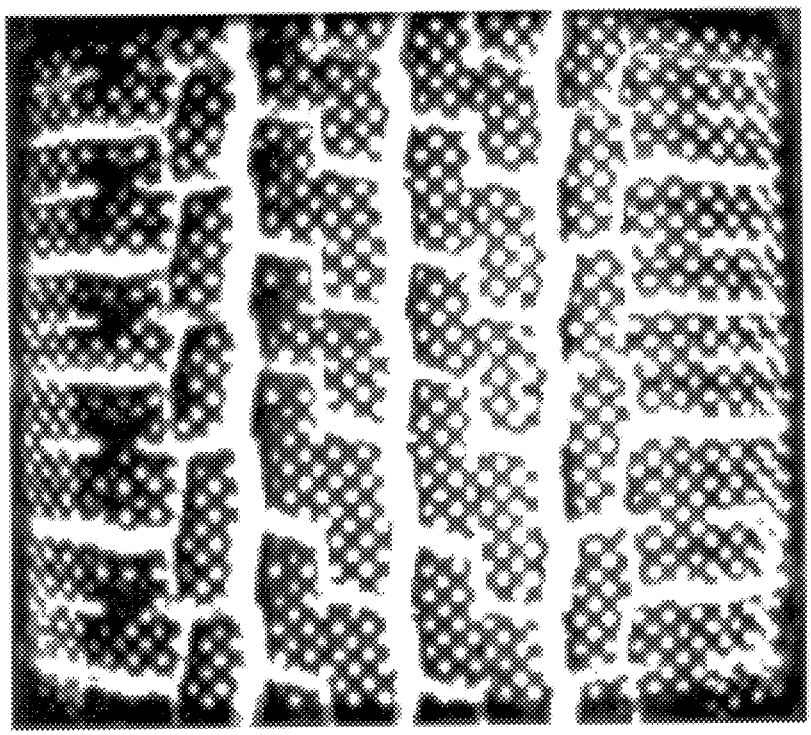
FIG. 4 is a view showing the bit map image of the tread surface illustrating the wearing state of the paint of the tread surface after the lapse of 6 minutes.
Figure 5:
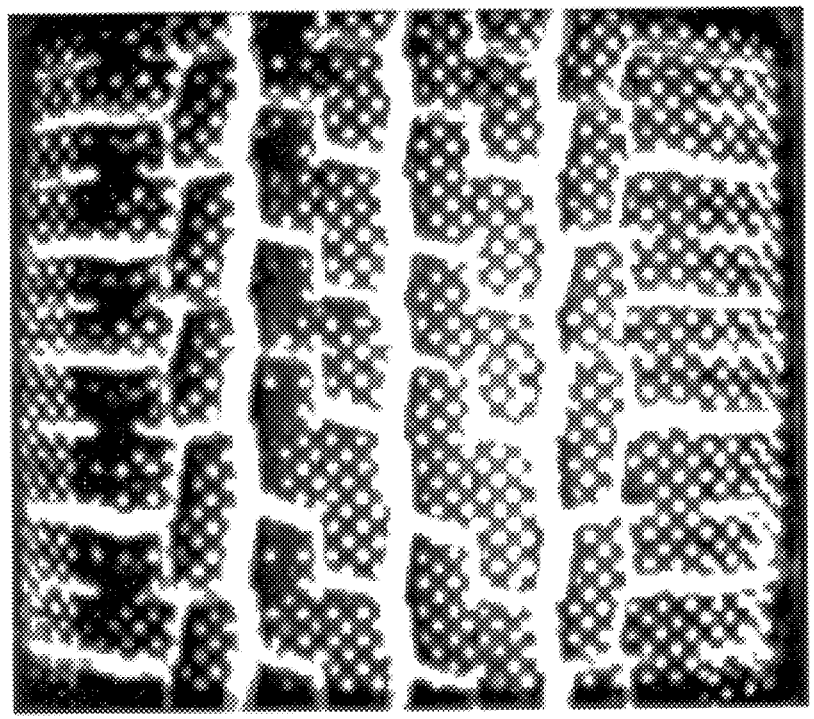
FIG. 5 is a view showing the bit map image of the tread surface illustrating the wearing state of the paint after the lapse of 9 minutes.

The wear degree of the coated paint is photographed every three minutes from the start of the running of the tire under the loaded condition. FIGS. 3, 4 and 5 show the photographed images at the 3, 6, and 9 minutes running of the tire.

Next, each of the photographed images and the photographed images taken before running the tire are divided into the total of 196,608 pixels (horizontal 512 pixels and vertical 384 pixels), and incorporated into the analysis system through the CCD camera. Then, the respective image information are subjected to the synthesis. The synthesis in this case is carried out based on the above-mentioned weighting in which, with respect to the respective pixels of the painted portion, the weighting factor of the pixel which has worn during three minutes running of the tire is 3, the weighting factor of the pixel which has worn during six minutes running of the tire is 2, the weighting factor of the pixel which has worn during nine minutes running of the tire is 1, and the weighting factor of the pixel which is free from any wear even after the nine minutes rotation of the tire is 0.

Subsequently, in order to convert the so-obtained wear information relating to the painted portion into a wide range wear information which also covers the respective pixels for a non-painted portion, a wear level value is calculated by the following equation:

$$(A/B) \times 100$$

where A is an average value of the weights of respective pixels corresponding to the painted portions, included in a predetermined periphery region of each of the pixels, with each of the pixels as a center, and B is the maximum weight value.

Figure 6:
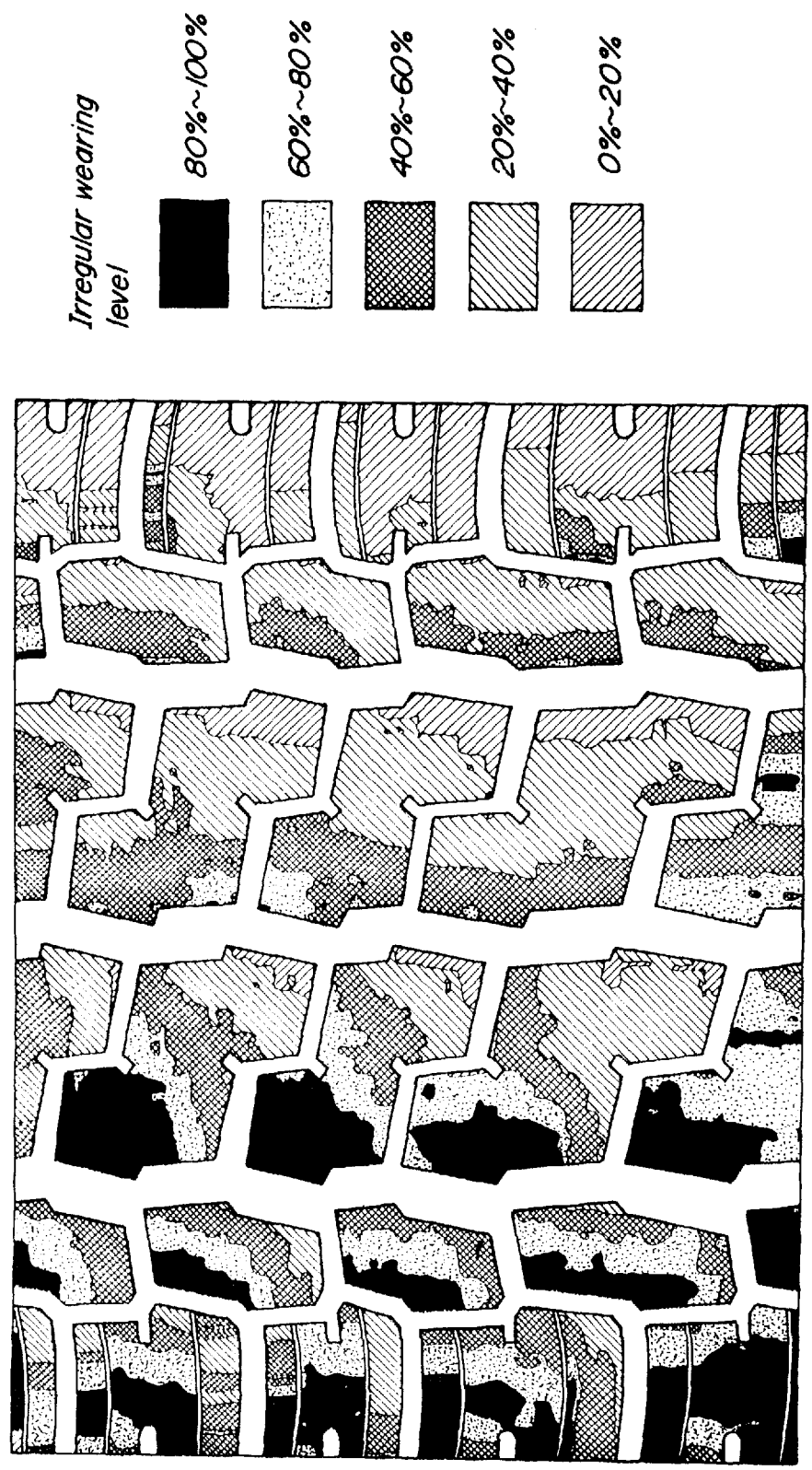
FIG. 6 is a view showing an estimated map image of the irregular wear.

Then, the estimation map of the irregular wear of the entire tread surface is prepared based on the respective wear level values. FIG. 6 exemplifies the estimation map therefor. In practical applications, it is highly desirable to classify the estimation map by color for the purpose of easy recognition.

By a visual observation of the above map, the location where the irregular wear occurs and the amount of the irregular wear can be estimated simply and easily with high accuracy and reliability.

Incidentally, in order to inspect the estimated results of the irregular wear which is obtained as described above, the amount of the irregular wear is quantified, and the respective values are compared with actual irregular wear amount on the tire which has been run over a distance of 2,000 km on the same condition as the above test conditions. The test results are in good conformity with the estimated results with respect to the following points:

(1) The occurring condition of the heel-and-toe wear of the left shoulder portion of the tread, and the amount of the irregular wear, shown in FIG. 6;
(2) The occurring condition of the heel-and-toe wear of the left second block row of the tread on a left side thereof, and the amount of the irregular wear;
(3) The shoulder cut ratio occurring in a radial direction of the tire; and
(4) The occurring condition of the irregular wear of the entire surface of the tread.

It will be appreciated from the foregoing description that, according to the invention, an irregular wear occurring on the actual tire can be estimated with high accuracy and reliability, taking into account the influence of the rubber material, etc., by a simple measurement which can be completed within a short time.

While the present invention has been described above with reference to a specific embodiment, it has been presented by way of example only, and various modifications may be made without departing from the scope of the invention as defined by the appended claims.

What is claimed is:
1. A method of estimating irregular wear of pneumatic tires, comprising the steps of:

coating paint on a tread surface of a tire in a regular manner, said paint being deformable following deformation of said tread surface;

recording a wearing degree of said paint as image information at each of a plurality of times at regular time intervals, while running said tire under a loaded condition;

dividing said image information for each of the plurality of times at regular time intervals into predetermined portion, each comprising a number of pixels, and storing image information associated with said respective pixels;

applying weights to said respective pixels corresponding to painted portions, each of said weights being inversely proportional to a duration of time during which said paint has been worn;

converting wear information for said painted portion into wide range wear information which also covers respective pixels for a non-painted portion of the tread, by calculating a wear level value of said respective pixels including said non-painted portion, in view of a weight of the pixel and weights of the peripheral pixels; and mapping each of said wear level values and estimating an irregular wear occurring state on said tread surface based on said mapped wear level value.

2. The method according to claim 1, wherein said wear level value of each of said pixels is calculated by the following equation:

$$(A/B) \times 100$$

where A is an average value of the weights of respective pixels corresponding to the painted portions, included in a predetermined periphery region of each of the pixels, with each of the pixels as a center, and B is the maximum weight value.

3. The method according to claim 1, wherein an estimated amount of irregular wear of said tread surface is quantified based on said wear level value of each of said pixels.

* * * * *